United States Patent
Tulchinsky et al.

(10) Patent No.: US 6,807,343 B2
(45) Date of Patent: Oct. 19, 2004

(54) RECONFIGURABLE OPTICAL BEAMFORMER FOR SIMPLIFIED TIME STEERED ARRAYS

(75) Inventors: David A. Tulchinsky, Arlington, VA (US); Paul J. Matthews, Ellicott City, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 4 days.

(21) Appl. No.: 10/156,197

(22) Filed: May 29, 2002

(65) Prior Publication Data

US 2002/0181874 A1 Dec. 5, 2002

Related U.S. Application Data

(60) Provisional application No. 60/293,519, filed on May 29, 2001.

(51) Int. Cl.[7] .................................................. G02B 6/26
(52) U.S. Cl. .......................... 385/39; 385/15; 385/140; 385/24
(58) Field of Search .......................................... 385/39

(56) References Cited

U.S. PATENT DOCUMENTS

| | | | | |
|---|---|---|---|---|
| 5,493,304 A | * | 2/1996 | Lee et al. | 342/360 |
| 5,936,588 A | * | 8/1999 | Rao et al. | 343/754 |
| 6,320,539 B1 | * | 11/2001 | Matthews et al. | 342/375 |

OTHER PUBLICATIONS

Tulchinsky et al, Demonstration of a Reconfigurable Beamformer for Simplified 2–D, Time–Steered Arrays, 2000 IEEE MTT–S International Microwave Symposium Digest, vol. 2.

Tulchinsky et al, Fiber–Optic Control of a Time–Steered Millimeter–Wave Transmit Array, MWP'99 Digest, pp. 279–282.

Tulchinsky et al, Range Demonstration of a Reconfigurable Fiber–Optic Time–Steered 2D Transmit Beamformer, Technical Digest, Microwave Photonics MWP 200, pp. 13–16.

Frankel et al, Reconfigurable Time–Steered Array–Antenna Beam Former, Applied Optics, vol. 36, No. 35, 1997, pp. 9261–9267.

\* cited by examiner

*Primary Examiner*—John R. Lee
(74) *Attorney, Agent, or Firm*—John J. Karasek; L. George Legg

(57) ABSTRACT

An array antenna apparatus for producing a time-delay beamformed RF signal includes a laser, a modulator for RF modulating the laser optical signal, a first plurality of optical paths coupling the modulator output to a dispersive prism, another plurality of optical paths coupling the dispersive prism outputs to a corresponding plurality of time delay trimmers, an attenuator coupled to each time delay trimmer, and an optical switching matrix to which the time delay trimmers outputs are input. The inputs to the optical switching matrix accordingly are time and amplitude adjusted to remove front end errors prior to rerouting. This is repeated in the back end of the apparatus, in which the switching matrix outputs are each applied to a corresponding attenuator, the outputs of which are then each applied to a photodetector to generate a plurality of replica RF signals that are each applied to a time shifter, thereby producing an error-corrected output that is then applied to an antenna array. The output of the antenna array is a time-delay beamformed RF signal having a 2-D beamsteering capability.

21 Claims, 2 Drawing Sheets

AZIMUTH STEERING

ELEVATION STEERING

45° INTER-CARDINAL
PLANE STEERING

RECONFIGURABLE OPTICAL BEAMFORMER FOR SIMPLIFIED TIME STEERED ARRAYS

The present application claims the benefit of the priority filing date of provisional patent application No. 60/293,519, filed May 29, 2001.

BACKGROUND OF INVENTION

1. Field of Invention

This invention pertains to beamformers which are controlled by means of time delay and tunable lasers.

2. Description of Related Art

Future multi-dimensional array antenna systems will most likely require true time-delay beam steering instead of phase-shifted beam steering since true time-delay beamformers have the ability to steer wide bandwidth signals without beam squint, i.e., frequency dependent steering. Current all-microwave based true time-delay beamformers suffer from severe drawbacks and are currently impractical. Using optical techniques to form 2-D beamformers has been effective at producing true time-delay systems, however, there have been many problems with past designs, including system complexity, optical power loss, component reproducibility, signal stability, and most importantly system cost. These constraints have effectively prevented optical true time-delay beamformers from being implemented in practical wideband antenna arrays having a large number of elements.

Several architectures have been suggested to reduce the cost and complexity issues associated with 2-D and other beamformers, which are summarized as follows:

(A) First are approaches that use switched optical time delay units, but reduce the number of time delay units required via wavelength division multiplexing at each individual antenna element. These approaches still require a large number of time delay units for 2-D and other steering, with some implementations trading off the number of optical time delay units for other inherent system wide problems such as a large number of matched, stable, narrow linewidth, precisely tunable lasers.

(B) A second approach aims at reducing the complexity and cost of the individual time delay units. One design is to use simple dispersive fiber links to implement a dispersive-prism for the time delays required, with a single tunable optical source per steering dimension. For 2-D control, this approach requires N time delay units for the first steering axis, and N×N or $N^2$ time delay units for the second steering axis, for a total of $N+N^2$ time delay units. The approach of cascading two sets of independent optical dispersive prisms, increases system cost, increases RF matching errors between individual elements, and reduces dynamic range. Two independently controlled wavelength tunable lasers or two sets of single wavelength switched laser banks also significantly increase system cost. Furthermore, this approach suffers from increased power loss due to two sets of inefficient RF-optical-RF conversions.

(C) The third approach uses a 2-D parallel free-space delay line switching architecture relying on cascading bits selected with spatial light modulators. This approach suffers from bulk optic problems of simultaneous alignment of hundreds of optical paths through multiple cascaded delays, long-term stability problems, optical diffraction over long distances, optical power matching between all channels, and free space coupling problems to wide bandwidth photodetectors.

A beamformer of a phase or time steered radar system is that component which electrically generates the appropriate amount of phase or time delay required to electronically control the propagation direction of the RF radiation which is emitted from the array antenna.

OBJECTS AND BRIEF SUMMARY OF THE INVENTION

An array antenna apparatus for producing a time-delay beamformed RF signal includes a laser, a modulator for RF modulating the laser optical signal, a first plurality of optical paths coupling the modulator output to a dispersive prism, another plurality of optical paths coupling the dispersive prism outputs to a corresponding plurality of time delay trimmers, an attenuator coupled to each time delay trimmer, and an optical switching matrix to which the time delay trimmers outputs are input. The inputs to the optical switching matrix accordingly are time and amplitude adjusted to remove front end errors prior to rerouting. This is repeated in the back end of the apparatus, in which the switching matrix outputs are each applied to a corresponding attenuator, the outputs of which are then each applied to a photodetector to generate a plurality of replica RF signals that are each applied to a time shifter, thereby producing an error-corrected output that is then applied to an antenna array. The output of the antenna array is a time-delay beamformed RF signal having a 2-D beamsteering capability.

It is an object of this invention to reduce the number of time delay units in forming a photonic beamformer.

It is another object of this invention to reduce the number of steering lasers in forming the architecture of a beamformer.

It is another object of this invention to reduce the complexity of producing an optical beamformer.

It is another object of this invention to minimize the time delay error associated with a reconfigurable optical switching matrix.

It is another object of this invention to displace radar beamformers operating on microwave phase shifter technology with beamformers characterized by a fiber optic time delay units.

Another object of this invention is reduction of electrical power by a factor of about 10–100, which is no longer required as there is less optical and RF loss in this system design.

Another object of this invention is making the beamformer smaller and lighter weight, which is of paramount importance to both the aerospace and satellite applications.

These and other objects can be achieved by a beamformer system, and method for its operation, which system is designed to transmit and steer a radiated RF beam from an antenna array wherein a continuous wave optical carrier is provided by a laser following which optical power is amplified, modulated, again amplified, divided into several optical paths, fed into a multi-channel dispersive prism which includes a time-delay gradient, the optical paths are further divided and are phase and amplitude trimmed, rerouted through an optical switch, further phase and amplitude adjusted, converted from light to RF power and then presented to an antenna array for emission.

Additional features and advantages of the present invention will be set forth in, or be apparent from, the detailed description of preferred embodiments which follows.

DETAILED DESCRIPTION OF THE INVENTION

Figure 1A:
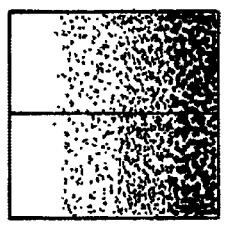
FIGS. 1a–c are schematic diagrams of the time delay gradient (top) and the assignment of the time delay units to the array elements (bottom) for azimuthal, elevation, and 45° steering, respectively.
Figure 1A:
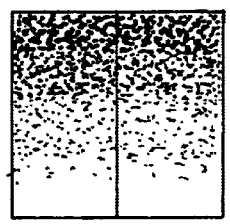
Figure 1A:
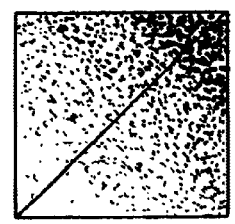
Figure 1A:
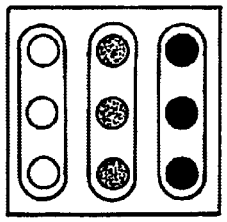
Figure 1B:
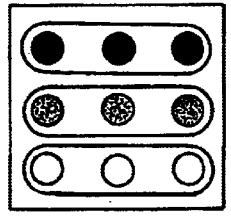
Figure 1C:
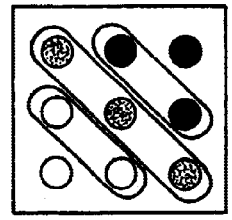

A basic principle of operation on which the present invention is based is that 2-D beam steering is basically a 1-D timing problem, when viewed in the proper coordinate system. To illustrate this concept, to steer in azimuth all that is required is a linear time delay gradient along the X-axis, as illustrated in FIG. 1a. This is achieved by connecting each column of vertical antenna elements to one of the signal feeds from a 1-D linear beamformer. Similarly, steering in elevation is accomplished by reassigning the linear time delay gradient from the 1-D beamformer to horizintal rows of antenna elements, as illustrated in FIG. 1b. Steering at an off-axis angle θ, means that the time delay, while still linear, is now applied to array elements grouped in an off XY-axis direction, as illustrated in FIG. 1c. The ability to assign/reassign to which antenna array elements the linear time delay signal is fed, is equivalent to the beamformer controlling the beam using a polar R, θ coordinate system wherein 2-D beam steering is achieved with a 1-D beamformer (controlling R) and a device to reconfigure the routing of the antenna array signals (θ control). This is unlike traditional beamformers, which use two separate time delay or phase gradients, with each gradient controlling steering along one of the two linear axes of a Cartesian XY coordinate system.

Figure 2:
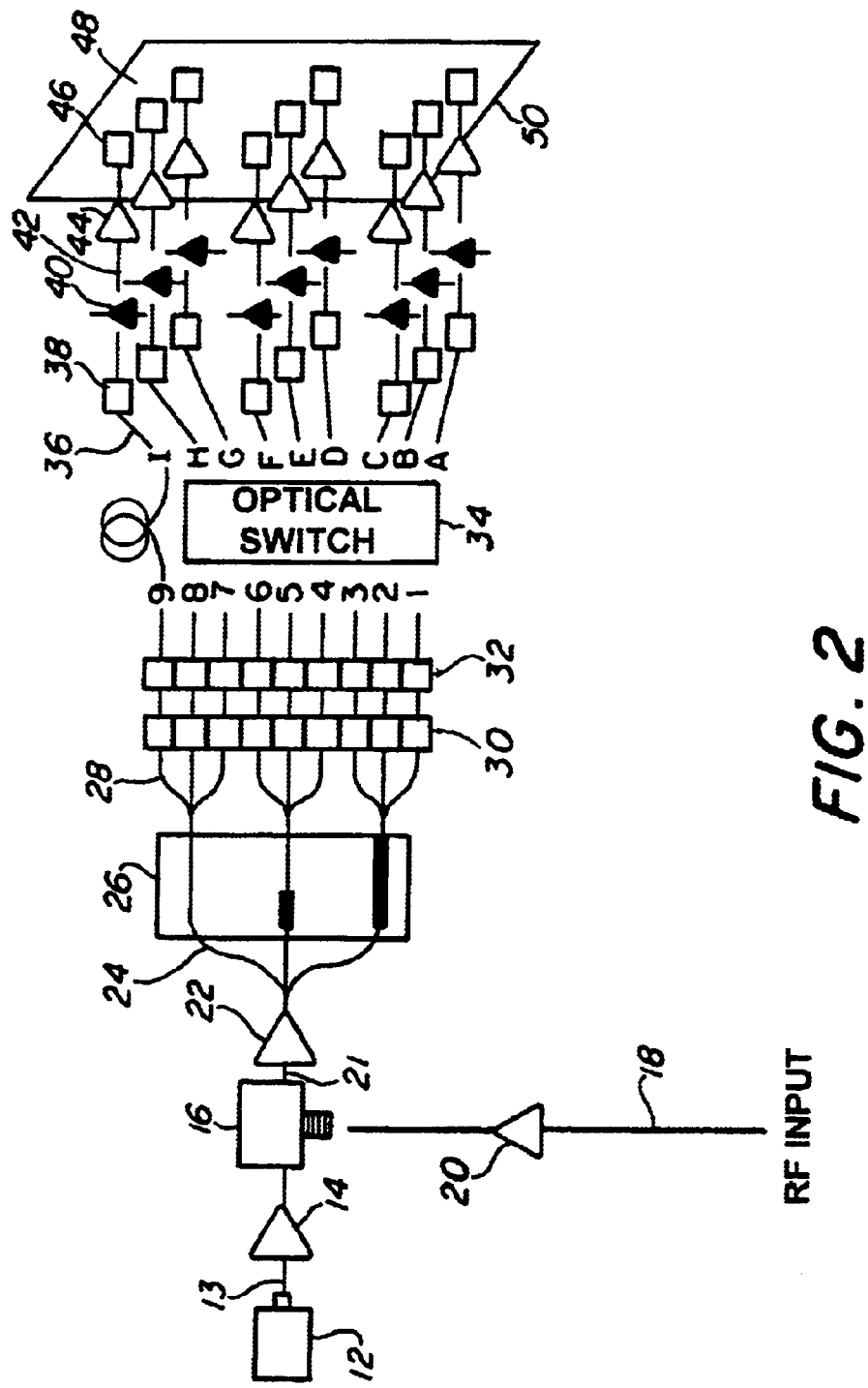
FIG. 2 is a schematic diagram of the reconfigurable 2-D fiber optic true time-delay beamformer.

Referring now to FIG. 2, a continuous wave optical carrier system 10 includes a wavelength tunable semiconductor laser 12 for producing an optical signal 13. Wavelength tunable laser 12 is interchangeable with a bank of single wavelength lasers. As is well known in the art, the use of any of the described amplifying components in the invention is dependent on the design choice of laser 12 and its power rating, which affects the strength of the original input optical signal 13 and whether subsequent processing requires amplification downstream of laser 12 of any component output signals. Accordingly, optical signal 13 is optionally then amplified by a polarization maintaining erbium-doped fiber amplifier (EDFA) 14 and is then fed via an optical fiber to a modulator 16, preferably an intensity modulator such as an electro-absorption modulator or an electro-optic modulator, e.g. a Mach Zehnder electro-optic intensity modulator (MZM). Modulator 16 functions to take an input RF analog signal 18, amplified by an RF amplifier 20, and impress its voltage replica onto the amplitude of signal 13, producing an amplitude-modulated optical signal 21. Modulated optical signal 21 is optionally further amplified by a second, optical amplifier 22, e.g. a second erbium-doped fiber amplifier, and is then divided into N optical paths 24 before being fed into an N-channel fiber optic dispersive prism 26 operating as an N-channel time delay unit. As shown, N=3 with three optical paths resulting in three separate time delays generated. It should be understood that the number of divisions is based on the system architecture, i.e. the number of switching elements in the optical switch and the number of RF feeds in the antenna array, as is further described below. As mentioned above, amplifiers 22 are optional and may be unnecessary if a high power wavelength tunable laser 12 is employed. Dispersive prism 26 can be made of either lengths of high dispersion optical fiber or with fiber Bragg gratings and optical circulators. The optical dispersion gradient of the dispersive prism 26 translates a wavelength change at laser 12 into a time-delay gradient imposed upon the optical carrier throughout the rest of system 10. Each of the 3 optical paths 24 are then divided into 3 parts for a total of 9 optical paths 28. Each optical path 28 then continues through a separate fiber optic time delay trimmer 30 and a fiber optic amplitude attenuator 32. Optical time delay trimmers 30 can be of any type with the desired substantially flat wavelength response and the desired amount of time-delay dynamic range. This first set of time and amplitude adjustments are one aspect of the invention and are required to insure equal optical path lengths and equal power trimming amidst all of the optical components before the optical switching matrix. Once the front end errors are minimized, these adjusters then allow us to reduce the errors introduced by an optical switching matrix 34.

The outputs of attenuators 32 are each coupled to an input of optical switching matrix 34, e.g. an 8 input×8 output device commercially available from NEL Electronics Corporation consisting of thermo-optic Mach-Zehnder interferometers and electronically controlled thermo-optic phase shifters. The device is strictly non-blocking, resulting in the capability to route any of the 8 input ports to any of the 8 output ports. This capability of the optical switching matrix 34 to reconfigure the assignment of the optical signals from the various time delay units routed to the elements of the antenna array (further described below) is what gives this 1-D beamformer the ability to steer in two-dimensions. As manufactured, optical switching matrix 34 has optical loss and optical path length (timing) errors which depend on the settings, e.g., when identical optical signals are injected to the input ports of switch 34, the signals passing through switch 34 to its output ports arrive at different times and have different magnitudes depending on the configuration of the switch. This performance limitation is a severe drawback for antenna array applications in which precise control over both magnitude and timing of the RF signals is required for proper beam formation. Accordingly, the present invention must be capable of both implementing this novel architecture while also overcoming these limitations. Since it is expected that all optical switching matrices and other types of switching matrices will be imperfect to some degree, the techniques described are more general in that they can be used to overcome timing and amplitude errors with any type of switching matrix. Furthermore, the size of optical switching matrix 34 limits the number of time delay units which can be rerouted and hence limits the size of the array which can be controlled. The size of optical switching matrix 34 also limits the number of pure directions along which the beamformer will steer, without additional timing adjustments. Optical switching matrix 34 may be of any type capable of redirecting the light from the input ports to the output ports. It should also be noted that the switching matrix used is not restricted to one of optical design, as the beamforming architecture is flexible in part; therefore, any method of reconfiguring the RF signal can be used.

Each of the output optical signals from optical switching matrix 34 then pass through a second set of optical attenuators 38 before being directed onto a photodetector 40, sensitive to the optical carrier power, which converts optical signal 36 into an electrical RF signal 42 which is a replica of the input RF signal 18. Optical attenuators 38 are interchangeable with microwave counterparts. Photodetectors 40 may be of any type which exhibit the desired frequency response. Each resulting RF signal 42 is amplified by a low noise RF amplifier 44, is then passed through a microwave time shifter 46 and fed into the input plane 48 of the antenna array 50. Time shifters 46 can be replaced by a set of optical time shifters inserted between optical switching matrix 34 and photodetectors 40. The second set of attenuators 38 and time shifters 46 provide the appropriate amplitude and time delays for the optical and microwave components in the second half of the system after optical switching matrix 34, by providing substantially equal optical path lengths and power trimming in that part of system 10. Once these back end errors are minimized, these adjusters then allow reduction of the errors introduced by optical switching matrix 34. Without both sets of adjustments, amplitude and timing errors would be too large for proper beam formation. A single set of time and amplitude adjustments do not have enough degrees of freedom to fully compensate for all the errors in this system. Amplifiers 44 can be of any type which exhibit the desired frequency and gain response, e.g. amplifiers operating in the microwave range.

During construction and testing of the system, it was discovered that the optical switching matrix as delivered has built-in timing errors, meaning that the optical path lengths through the optical switching matrix varied and depended on the switch settings. The timing errors were measured to be on average ±4.75 ps and at worst ±14.6 ps. Timing errors of this magnitude translate to an average error in the difference in the path lengths between the various channels in the optical switching of about ±1.5 mm. While this may not be an exceedingly large manufacturing error, a ±4.75 ps timing error translates into an RF phase error of ±10.3° at 6 Ghz and ±31° at 18 GHz between the radiating elements of the antenna array. [phase error (°)=timing error (ps)×Frequency (GHz)×360°/1000]. In antenna array applications, tight control over both amplitude and phase error are critical, since these errors result in antenna radiation in non-mainbeam directions (poor directivity), raised sidelobe levels, and poor beam pointing accuracy. The tolerable amounts of amplitude and phase errors for an array may be calculated, but a rule-of-thumb design criteria is to permit a maximum phase error of about 10° for antenna arrays, whose average far-out sidelobe level is numerically equal to the non-error gain of the array antenna (a typical array requirement). To mitigate this problem, an operational method was developed to reduce the overall amplitude and timing errors of the system, described as follows:

1. Measure the amplitude and timing for each optical link and adjust the input amplitude and time trimmers to minimize the amplitude and path length error when all of the input optical signals are switched through the optical switching matrix to a single output channel/photodetector/amplifier link. This minimizes errors before optical switching matrix 34.
2. Measure the amplitude and timing for each optical link and adjust the output amplitude and time trimmers to minimize the amplitude and path length error when a single input optical signal is switched through the optical switching matrix to all of the output channel/photodetector/amplifier links. This minimizes errors after optical switching matrix 34.
3. Measure the amplitude errors and timing errors for all input channels switched to all output channels at the greatest RF frequency for which the system is designed to operate (worst case for phase errors).
4. Using either a spreadsheet calculation, a suitable computer program, or hand calculation, minimize the amplitude errors by adding or subtracting units of amplitude adjustment in the following manner:
    a). Add/subtract amplitude to each of the input channels and propagate the resulting amplitude deviation to all to all of the output channels.
    b). (Same as a, above) Add/subtract amplitude to each of the output channels and propagate the resulting amplitude deviation to all of the input channels.
    c). Calculate the standard deviation of the amplitude errors for all of the channels. Note this value. Go back to step 4a) and repeat until the standard deviation is minimized or within acceptable values. When the standard deviation is minimized, record the amount of amplitude adjustment required for each channel.
5. Using either a spreadsheet calculation, a suitable computer program, or by hand calculation, minimize the timing errors by adding or subtracting units of path length adjustment in the following manner:
    a). Add/subtract path length to each of the input channels and propagate the resulting timing error to all of the output channels.
    b). Add/subtract path length to each of the output channels and propagate the resulting timing error to all of the input channels.
    c). Calculate the standard deviation of the timing errors for all of the channels. Note this value. Go back to step 5a) and repeat until the standard deviation is minimized or within acceptable values. When the standard deviation is minimized, record the amount of path length adjustment required for each channel.
6. While measuring the amplitude and phase, adjust the appropriate amplitude and path length adjusters on both the input and output sides of the optical switching matrix using the values obtained in steps 4 and 5.

The system is now at the minimum overall amplitude and timing error possible. Residual error is a combination of errors in the optical switching matrix and other error sources in the components of the system.

To experimentally verify the functionality of the reconfigurable optical beamformer described above, the amplitude and phase of a RF signal propagating through all 64 possible combinations of optical paths in the optical system was measured. The system was also tested in the laboratory to measure its ultrawideband RF steering capacity. The system was then tested in an anechoic radar chamber to test both the capability of the reconfigurable beam steering as well as the ability to produce a squint-free beam.

An example of the reduction in the phase error for the current system using the technique described above shows the measured phase tracking of all 64 possible paths through the optical switching matrix without correcting for the phase errors of the optical switching matrix. (As an experimental starting point with which to compare, the standard deviation of the phase for the system without the optical switching matrix was measured to be 4.5° from 6–18 GHz). Without correcting for the phase tracking of the optical switching matrix, the standard deviation of the phase from 6–18 GHz was measured the standard to be 31.2°. After correcting for the phase error, the system was measured to have a standard deviation in the phase of 17.4° for 6–18 GHz, a 44% decrease in phase error. The minimum calculated phase error is expected to be 15.7° for 6–18 Ghz, which in practice might be achievable with more precise time adjustments.

After further laboratory testing, the reconfigurable beamforming system was attached to a 2-D antenna array and tested in a compact anechoic radar chamber. The first set of tests were designed to test the ability of the beamformer to produce and steer a wideband squint-free beam (frequency independent steering).

The ability of the 1-D beamformer's ability to steer along multiple axes was carried out for RF radiation at 12 GHz. Successful steering of a beam to other angles (±15°, ±30°, and ±45°) was also demonstrated along both the azimuthal and elevational axis and also along the ±45° inter-cardinal planes, by a mere reconfiguration of the beamformer (axis selection) or a change in the laser wavelength (angle selection). Similar results were obtained at the above steered angles and along the above steered axes for frequencies ranging from 6–18 GHz. The frequency range was limited solely by the microwave components used in the system.

Obviously many modifications and variations of the present invention are possible in the light of the above teachings. For example, a 2-D receive beamformer architecture could be similarly constructed by appropriately reversing the beamformer design. And, the 1-D true time delay beamformer is not restricted to the optical dispersion techniques described herein, and any method of generating a true time delay, optical, RF, or otherwise, can be employed. It is therefore to be understood that the scope of the invention should be determined by referring to the following appended claims.

We claim:

1. An optical beamformer, comprising:
   a laser for generating an optical signal;
   a modulator having a first input for receiving the optical signal, a second input for receiving an RF input signal, and an output for applying a modulated optical signal;
   a first plurality of optical paths, each said optical path of said first plurality of optical paths having an input coupled to the modulator output and an output;
   a dispersive prism having a plurality of inputs, each said prism input coupled to a corresponding optical path output of said first plurality of optical paths, and a plurality of corresponding outputs;
   a second plurality of optical paths, each said optical path of said second plurality of optical paths having an input coupled to a dispersive prism output and having an output;
   a plurality of time delay trimmers, each having an input coupled to a corresponding output of an optical path of said second plurality of optical paths and an output;
   a first plurality of attenuators, each having an input coupled to a corresponding time delay trimmer output, and an output;
   an optical switching matrix having a plurality of inputs, each coupled to a corresponding attenuator output, and having a plurality of reroutable outputs;
   a second plurality of attenuators, each having an input coupled to a corresponding reroutable output, and having a corresponding plurality of outputs;
   a plurality of photodetectors each having an input coupled to a corresponding output of an attenuator of said second plurality of attenuators and an output for applying a replica RF signal; and
   a plurality of time shifters, each having an input coupled to a corresponding photodetector output and an output for applying a plurality of time shifted RF signals.

2. An optical beamformer as in claim 1, further comprising a first amplifier coupled between the laser and the first input of the modulator for amplifying the optical signal applied to the modulator.

3. An optical beamformer as in claim 1, further comprising a plurality of RF amplifiers, each having an input coupled to a corresponding photodetector output and an output coupled to a corresponding input of a time shifter to thereby amplify the replica RF signals applied to the time shifters.

4. An optical beamformer as in claim 1, wherein said laser is a wavelength tunable semiconductor laser.

5. An optical beamformer as in claim 1, further comprising a second, optical amplifier coupling the modulator and the dispersive prism for amplifying the modulated optical signal.

6. An optical beamformer as in claim 1, wherein the dispersive prism is high dispersion optical fiber.

7. An optical beamformer as in claim 1, wherein the dispersive prism comprises Bragg gratings and optical circulators.

8. An array antenna apparatus for producing a time-delay beamformed RF signal, comprising:
   a laser for generating an optical signal;
   a modulator having a first input for receiving the optical signal, a second input for receiving an RF input signal, and an output for applying a modulated optical signal;
   a first plurality of optical paths, each said optical path of said first plurality of optical paths having an input coupled to the modulator output and an output;
   a dispersive prism having a plurality of inputs, each said prism input coupled to a corresponding optical path output of said first plurality of optical paths, and a plurality of corresponding outputs;
   a second plurality of optical paths, each said optical path of said second plurality of optical paths having an input coupled to a dispersive prism output and having an output;
   a plurality of time delay trimmers, each having an input coupled to a corresponding output of an optical path of said second plurality of optical paths and an output;
   a first plurality of attenuators, each having an input coupled to a corresponding time delay trimmer output, and an output;
   an optical switching matrix having a plurality of inputs, each coupled to a corresponding attenuator output, and having a plurality of reroutable outputs;
   a second plurality of attenuators, each having an input coupled to a corresponding reroutable output, and having a corresponding plurality of outputs;
   a plurality of photodetectors each having an input coupled to a corresponding output of an attenuator of said second plurality of attenuators and an output for applying a replica RF signal;
   a plurality of time shifters, each having an input coupled to a corresponding photodetector output and an output for applying a plurality of time shifted RF signals; and
   an antenna array having a plurality of inputs for receiving each of said time shifted RF signals and an output for applying a time-delay beamformed RF signal.

9. An array antenna apparatus as in claim 8, further comprising a first amplifier coupled between the laser and the first input of the modulator for amplifying the optical signal applied to the modulator.

10. An array antenna apparatus as in claim 8, further comprising a plurality of RF amplifiers, each having an input coupled to a corresponding photodetector output and an output coupled to a corresponding input of a time shifter to thereby amplify the replica RF signals applied to the time shifters.

11. An array antenna apparatus as in claim 8, wherein said laser is a wavelength tunable semiconductor laser.

12. An array antenna apparatus as in claim 8, further comprising a second, optical amplifier coupling the modulator and the dispersive prism for amplifying the modulated optical signal.

13. An array antenna apparatus as in claim 8, wherein the dispersive prism is high dispersion optical fiber.

14. An array antenna apparatus as in claim 8, wherein the dispersive prism comprises Bragg gratings and optical circulators.

15. An array antenna apparatus for producing a time-delay beamformed RF signal, comprising:

means for generating an optical signal;

means for RF modulating said amplified optical signal and for applying a modulated optical signal output;

first means for dividing said modulated optical signal into a first plurality of optical paths each having an output;

means for receiving said outputs of said first plurality of optical paths and for introducing a time delay gradient thereto at a corresponding plurality of outputs;

second means for dividing each of said plurality of time delay gradient-introduced outputs into a second plurality of optical paths each having an output;

means for trimming each said second plurality of optical paths output to produce a plurality of error-corrected outputs;

first means for attenuating each of said error-corrected outputs;

means for rerouting said error-corrected outputs to form a 2-D steered output;

second means for attenuating said 2-D steered optical output;

means for converting said 2-D steered optical output into a plurality of replica RF signals;

means for time-shifting said amplified plurality of replica RF output signals; and means for receiving said time-shifted, amplified plurality of replica RF output signals and for applying a time-delay beamformed RF signal.

16. An array antenna apparatus as in claim 15, further comprising means for amplifying said optical signal.

17. An array antenna apparatus as in claim 15, further comprising means for amplifying said plurality of replica RF output signals.

18. An array antenna apparatus as in claim 15, wherein said means for generating an optical signal is a wavelength tunable semiconductor laser.

19. An array antenna apparatus as in claim 15, further comprising means for amplifying a modulated optical signal received from the means for RF modulating having an output coupled to an input of the means for receiving said outputs of said first plurality of optical paths and for introducing a time delay gradient thereto.

20. An array antenna apparatus as in claim 15, wherein the means for receiving said outputs of said first plurality of optical paths and for introducing a time delay gradient thereto is high dispersion optical fiber.

21. An array antenna apparatus as in claim 15, wherein the means for receiving said outputs of said first plurality of optical paths and for introducing a time delay gradient thereto comprises Bragg gratings and optical circulators.

* * * * *